United States Patent
Nachenberg (10) Patent No.: US 8,225,406 B1
(45) Date of Patent: Jul. 17, 2012

(54) SYSTEMS AND METHODS FOR USING REPUTATION DATA TO DETECT SHARED-OBJECT-BASED SECURITY THREATS

(75) Inventor: Carey S. Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 557 days.

(21) Appl. No.: 12/415,834

(22) Filed: Mar. 31, 2009

(51) Int. Cl.
*G06F 11/00* (2006.01)

(52) U.S. Cl. .............. 726/24; 726/22; 726/23; 726/25

(58) Field of Classification Search .............. 726/24, 726/22, 23, 25; 713/188
See application file for complete search history.

(56) References Cited

U.S. PATENT DOCUMENTS

| | | | |
|---|---|---|---|
| 6,618,735 B1* | 9/2003 | Krishnaswami et al. | 1/1 |
| 7,269,851 B2 | 9/2007 | Ackroyd | |
| 7,814,471 B2* | 10/2010 | Jodh | 717/163 |
| 7,831,412 B1 | 11/2010 | Sobel et al. | |
| 7,917,481 B1* | 3/2011 | Kale et al. | 707/693 |
| 7,966,278 B1 | 6/2011 | Satish | |
| 2002/0174358 A1* | 11/2002 | Wolff et al. | 713/200 |
| 2004/0205167 A1 | 10/2004 | Grumann | |
| 2005/0021733 A1 | 1/2005 | Clinton et al. | |
| 2005/0283622 A1 | 12/2005 | Hall et al. | |
| 2005/0283831 A1 | 12/2005 | Ryu et al. | |
| 2006/0253584 A1 | 11/2006 | Dixon et al. | |
| 2007/0016953 A1* | 1/2007 | Morris et al. | 726/24 |
| 2007/0162458 A1 | 7/2007 | Fasciano | |
| 2007/0300215 A1 | 12/2007 | Bardsley | |
| 2008/0141240 A1 | 6/2008 | Uthe | |
| 2009/0133126 A1* | 5/2009 | Jang et al. | 726/24 |
| 2009/0138856 A1 | 5/2009 | Oja et al. | |
| 2010/0162391 A1* | 6/2010 | Loveland et al. | 726/22 |
| 2011/0185429 A1* | 7/2011 | Sallam | 726/24 |
| 2011/0225655 A1* | 9/2011 | Niemela et al. | 726/24 |

OTHER PUBLICATIONS

Satish, Sourabh; U.S. Appl. No. 12/056,379, filed Mar. 27, 2008.
Satish, Sourabh; U.S. Appl. No. 12/049,751, filed Mar. 17, 2008.
Non-Final Office Action in U.S. Appl. No. 12/049,751; Jun. 24, 2011.
Final Office Action in U.S. Appl. No. 12/049,751; Jan. 19, 2012.
William E. Sobel et al.; U.S. Appl. No. 12/059,003, filed Mar. 31, 2008.
Non-Final Office Action in U.S. Appl. No. 12/059,003; Aug. 18, 2011.
Sourabh Satish et al.; U.S. Appl. No. 11/394,846, filed Mar. 31, 2006.
Non-Final Office Action in U.S. Appl. No. 11/394,846; Mar. 6, 2009.

(Continued)

*Primary Examiner* — Samson Lemma
(74) *Attorney, Agent, or Firm* — Advantedge Law Group (57) ABSTRACT

Computer-implemented methods and systems for using reputation data to detect shared-object-based security threats are disclosed. In one example, an exemplary method for performing such a task may comprise: 1) identifying a process, 2) identifying an executable file associated with the process, 3) identifying at least one shared object loaded by the process, 4) obtaining reputation data for both the executable file and the shared object from a reputation service, 5) determining that the shared object represents a potential security risk by comparing the reputation data for the executable file with the reputation data for the shared object and determining that the reputation data for the shared object is significantly different from the reputation data for the executable file, and then 6) performing a security operation on the shared object. Corresponding server-side methods and systems for identifying malicious shared objects based on reputation data are also disclosed.

20 Claims, 7 Drawing Sheets

OTHER PUBLICATIONS

Final Office Action in U.S. Appl. No. 11/394,846; Sep. 1, 2009.
Non-Final Office Action in U.S. Appl. No. 11/394,846; Feb. 23, 2010.
Final Office Action in U.S. Appl. No. 11/394,846; Jul. 22, 2010.
Non-Final Office Action in U.S. Appl. No. 11/394,846; Dec. 9, 2010.
Final Office Action in U.S. Appl. No. 11/394,846; May 12, 2011.
Keith Newstadt et al.; U.S. Appl. No. 13/291,773, filed Nov. 8, 2011.

* cited by examiner

SYSTEMS AND METHODS FOR USING REPUTATION DATA TO DETECT SHARED-OBJECT-BASED SECURITY THREATS

BACKGROUND

Computer-security researchers have estimated that up to 50% of computer-security threats have some form of shared-object-based component. These threats typically "inject" malicious shared objects (e.g., DLLs) into otherwise legitimate processes. The malicious code contained within the injected shared object may then perform malicious actions under the cover of an otherwise legitimate process.

For example, a malware developer may register a malicious DLL (by, for example, tricking a user into running a malicious executable file or by exploiting a buffer overflow in a legitimate application) for loading by an otherwise legitimate application, such as MICROSOFT WORD for WINDOWS. In this example, when MICROSOFT WORD loads, the malicious DLL will also load and launch, potentially scheduling background threats that launch attacks directly from the process space associated with MICROSOFT WORD.

Because the code contained within malicious DLLs may run under the cover of an otherwise legitimate process, it is sometimes difficult to detect and eliminate malicious DLLs without also harming their legitimate host process. As such, the instant disclosure identifies a need for systems and methods for detecting and eliminating shared-object-based security threats.

SUMMARY

Various client-side and backend systems and methods for using reputation data to detect shared-object-based security threats are disclosed herein. As will be described in greater detail below, an exemplary client-side method for performing such a task may comprise: 1) identifying a process (e.g., at loadtime or runtime), 2) identifying a primary executable file that is associated with the process, 3) identifying each shared object (e.g., DLL) that is loaded by the process, 4) obtaining reputation and/or prevalence information for both the executable file and each of the shared objects from a reputation service (based on, for example, hashes of the executable file and the shared objects), and then 5) comparing the reputation/prevalence information for both the executable file and each of the shared objects.

If the reputation/prevalence information for at least one of the shared objects is significantly lower than that of either the executable file or the majority of the remaining shared objects (e.g., if a shared object has a significantly lower reputation score and/or is much less prevalent than either the executable file or a majority of the remaining shared objects loaded by the process), then the client-side system may determine that this shared object represents a potential security risk. In this example, the client-side system may perform a security operation on the identified shared object by, for example, quarantining or removing the shared object, preventing the shared object from loading, flagging the shared object for further evaluation, and/or removing references to the shared object (e.g., load points for the shared object stored in a computing device's registry) from the computing device.

In some examples, the client-side system may also correlate mismatches in reputation/prevalence information with mismatches in file metadata associated with the executable file and/or shared objects. For example, the client-side system may compare publisher information, publication-date information, and/or digital-signer information for both the executable file and each of the shared objects to determine whether there are any significant differences. In some examples, upon comparing either reputation/prevalence information and/or file metadata, the client-side system may send the results of such comparisons to the reputation service.

As detailed above, exemplary backend methods for using reputation data to identify shared objects that pose potential security threats are also disclosed. A backend implementation of such a method may comprise: 1) receiving process metadata (i.e., information that identifies, for a process, an executable file associated with the process and each of the shared objects loaded by the process) from a plurality of user devices within a community, 2) accessing reputation/prevalence information for both the executable file and each of the shared objects, and then 3) comparing the reputation/prevalence information for both the executable file and each of the shared objects to identify shared objects that represent potential security threats, as detailed above.

In some examples, the backend system may be able to determine, by analyzing the process metadata received from the plurality (and potentially millions) of user devices within the community, that the shared object is rarely loaded by the process, rarely associated with shared objects that are commonly loaded by the process, frequently loaded by compromised user devices, and/or frequently loaded by processes with low reputation scores. The backend system may also update an existing reputation score for the shared object based on any of these findings.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using reputation data to detect shared-object-based security threats. The term "shared object," as used herein, generally refers to files that contain code and data that may be shared by independent programs. Examples of shared objects include, without limitation, shared libraries such as DLLs and .so files. In addition, the phrase "shared-object-based security threat" may refer to any computer-security threat that comprises at least one shared-object-based component.

Figure 1:
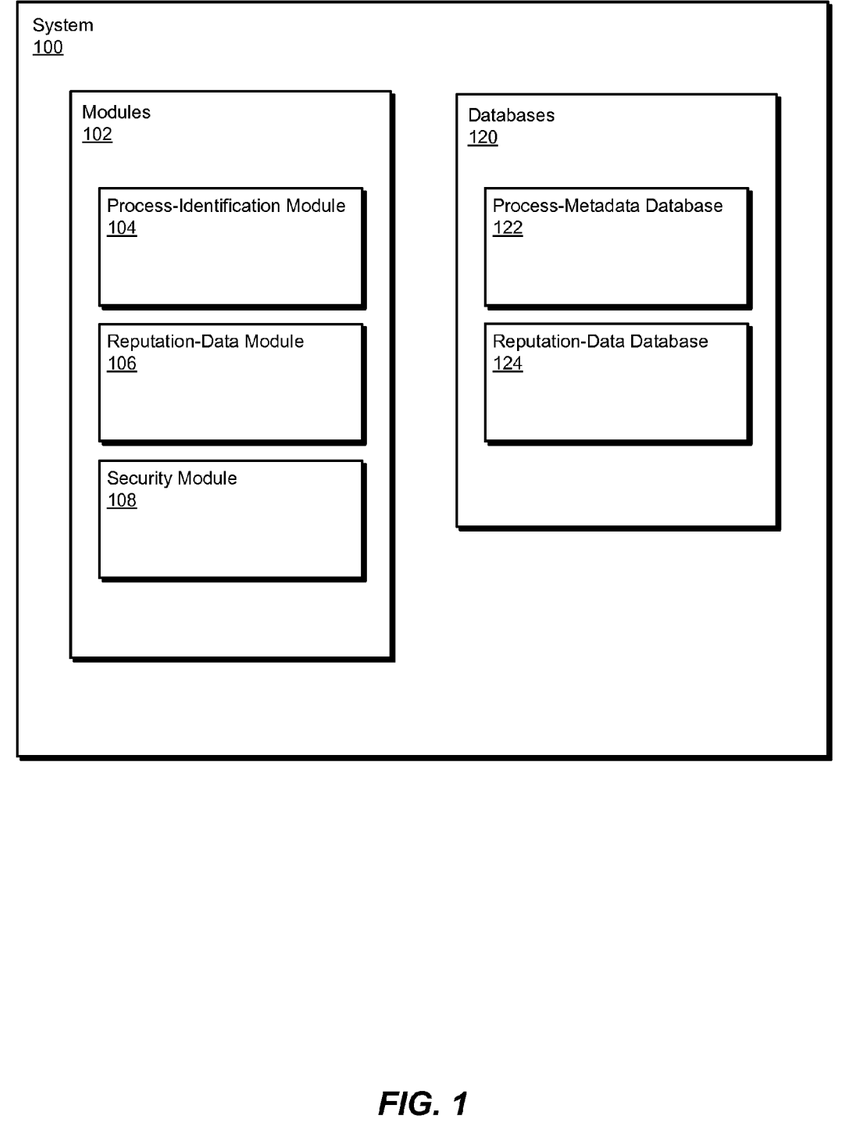
FIG. 1 is a block diagram of an exemplary system for using reputation data to detect shared-object-based security threats.
Figure 2:
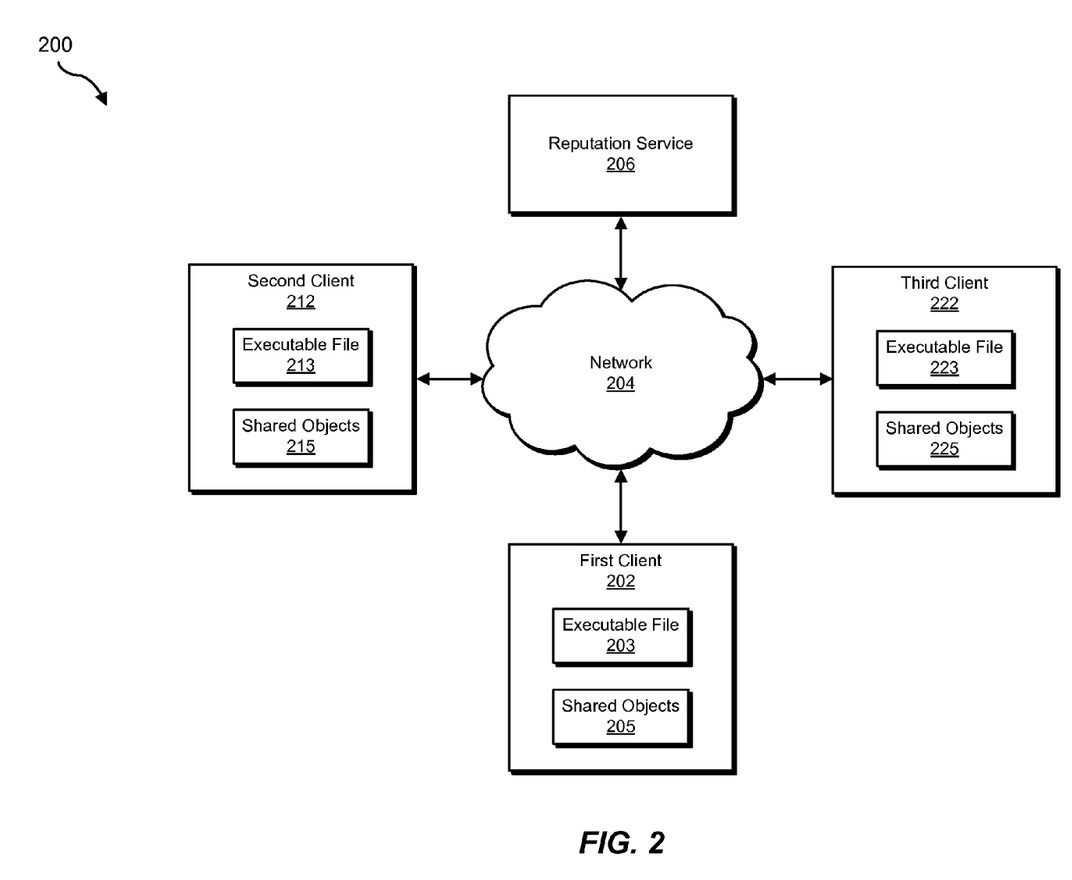
FIG. 2 is a block diagram of an exemplary system for using reputation data to detect shared-object-based security threats.

The following will provide, with reference to FIGS. 1-2, detailed descriptions of exemplary systems for using reputation data to detect shared-object-based security threats. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for using reputation data to detect shared-object-based security threats. As illustrated in this figure, exemplary system 100 may comprise one or more modules for performing one or more tasks. For example, and as will be explained in greater detail below, exemplary system 100 may comprise a process-identification module 104 programmed to identify processes loaded onto or running on a computing device. Exemplary system 100 may also comprise a reputation-data module 106 programmed to request reputation data from a reputation service, such as reputation service 206 in FIG. 2.

In addition, and as will be described in greater detail below, exemplary system 100 may comprise a security module 108 programmed to perform security operations on shared objects that represent potential security risks. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., reputation service 206 and/or clients 202, 212, and 222), computing system 610 in FIG. 6, and/or portions of exemplary network architecture 700 in FIG. 7. For example, modules 102 may represent portions of a security-software application installed on clients 202, 212, and/or 222. One or more of modules 102 in FIG. 1 may also represent all or portions of one or more special-purpose computers configured to perform one or more tasks.

As illustrated in FIG. 1, exemplary system 100 may also comprise one or more databases 120. Databases 120 may represent portions of a single database or computing device or a plurality of databases or computing devices. In one embodiment, databases 120 may comprise a process-metadata database 122 for storing process metadata received from user devices within a community. Exemplary databases 120 may also comprise a reputation-data database 124 for storing reputation data (e.g., reputation scores and prevalence information), as will be explained below.

Databases 120 in FIG. 1 may represent a portion of one or more computing devices. For example, databases 120 may represent a portion of reputation service 206 and/or clients 202, 212, and 222 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as reputation service 206 and/or clients 202, 212, and 222 in FIG. 2, computing system 610 in FIG. 6, and/or portions of exemplary network architecture 700 in FIG. 7.

FIG. 2 is a block diagram of an exemplary system 200 for using reputation data to detect shared-object-based security threats. As illustrated in this figure, exemplary system 200 may comprise a plurality of clients 202, 212, and 222 in communication with a reputation service 206 via a network 204.

Clients 202, 212, and 222 may represent computing systems within one or more communities, such as an enterprise, user base, or portions or combinations of the same. In one embodiment, and as will be described in greater detail below, clients 202, 212, and 222 may be programmed to: 1) identify a process (e.g., at loadtime or runtime), 2) identify a primary executable file that is associated with the process, 3) identify each shared object that is loaded by the process, 4) obtain reputation and/or prevalence information for both the executable file and each of the shared objects from reputation service 206 (based on, for example, hashes of the executable file and the shared objects), and then 5) compare the reputation/prevalence information for both the executable file and each of the shared objects.

If the reputation/prevalence information for at least one of the shared objects is significantly lower than that of either the executable file or the majority of the remaining shared objects (e.g., if a shared object has a significantly lower reputation score and/or is much less prevalent than either the executable file or the remaining shared objects loaded by the process), then clients 202, 212, and/or 222 may determine that this shared object represents a potential security risk and perform a security operation on the suspicious shared object.

In some examples, clients 202, 212, and 222 may also be programmed to send process metadata (i.e., information that identifies, for a process, an executable file associated with the process and each of the shared objects loaded by the process) to reputation service 206. Upon receiving this process metadata, reputation service 206 may be programmed to: 1) access reputation/prevalence information for both the executable file and each of the shared objects from reputation-data database 124 in FIG. 1 and then 2) compare the reputation/prevalence information for both the executable file and each of the shared objects in order to detect shared objects that represent potential security threats, as detailed above.

Clients 202, 212, and 222 generally represent any type or form of computing device capable of reading computer-executable instructions. Examples of clients 202, 212, and 222 include, without limitation, laptops, desktops, servers, cellular phones, personal digital assistants (PDAs), multimedia players, embedded systems, combinations of one or more of the same, exemplary computing system 610 in FIG. 6, and any other suitable computing device.

Reputation service 206 generally represents any type or form of computing subsystem used to generate and provide information that identifies a file's reputation or prevalence. As will explained in greater detail below, in some examples reputation service 206 may generate such information by collecting, aggregating, and analyzing data from user devices within a community (e.g., the user base of a security-software publisher).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., GSM Network), exemplary network architecture 700 in FIG. 7, or the like. Network 204 may facilitate communication or data transfer using wireless or wired connections. In one embodiment, network 204 may facilitate communication between clients 202, 212, and 222 and reputation service 206.

Figure 3:
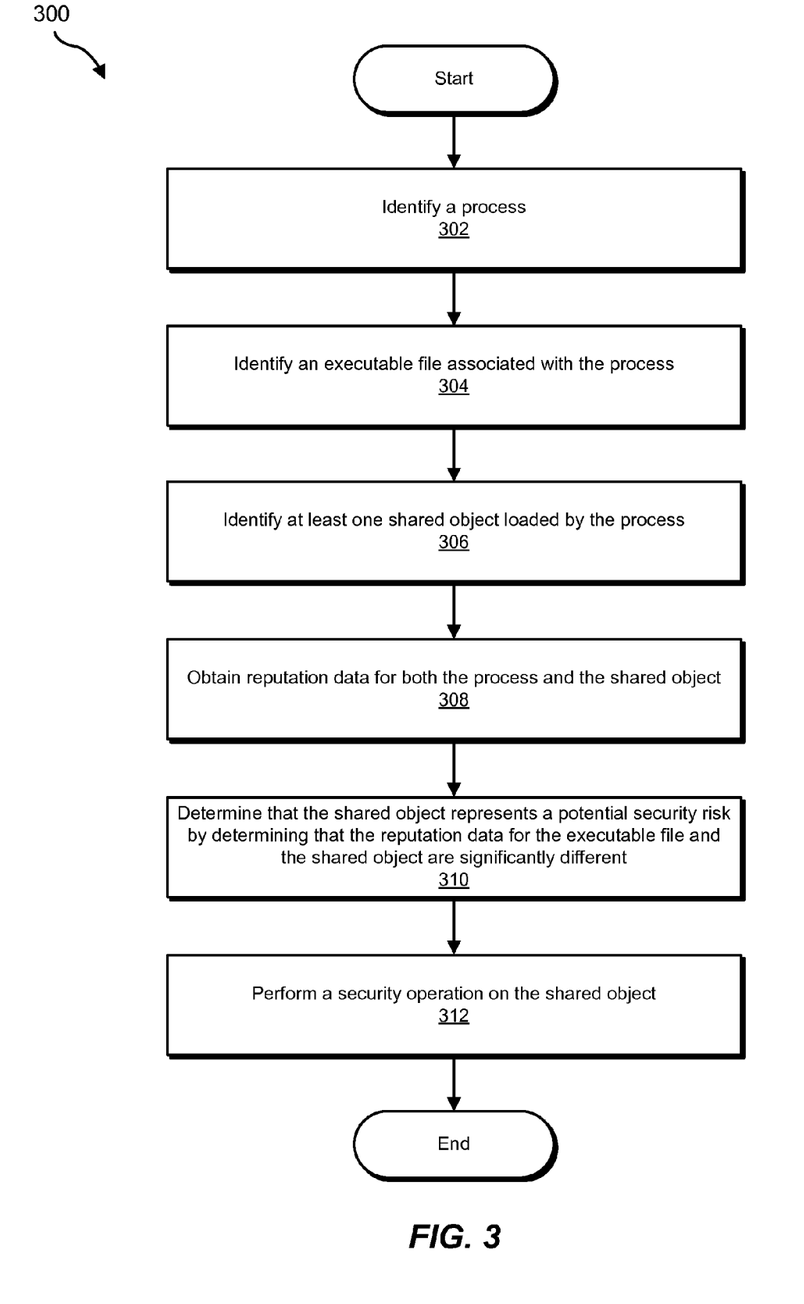
FIG. 3 is a flow diagram of an exemplary method for using reputation data to detect shared-object-based security threats.

FIG. 3 is a flow diagram of an exemplary computer-implemented method 300 for using reputation data to detect shared-object-based security threats. As illustrated in this figure, at step 302 the system may identify a process on a computing device. For example, process-identification module 104 in FIG. 1 (which may, as detailed above, represent a portion of a security-software application on first client 202 in FIG. 2) may identify a process named "editor.exe" on first client 202.

The system may perform step 302 in a variety of ways. In one example, the system may detect a process when it is loaded into memory (i.e., at loadtime). In an additional example, the system may identify a process when the process begins executing instructions (i.e., at runtime).

At step 304, the system may identify an executable file associated with the process identified in step 302. For example, process-identification module 104 in FIG. 1 (which may, as detailed above, represent a portion of a security-software application on first client 202 in FIG. 2) may determine that the executable file "editor.exe" located at "C:\Program Files\Editor" is primarily responsible for launching the process "editor.exe" identified in step 302.

Figure 4:
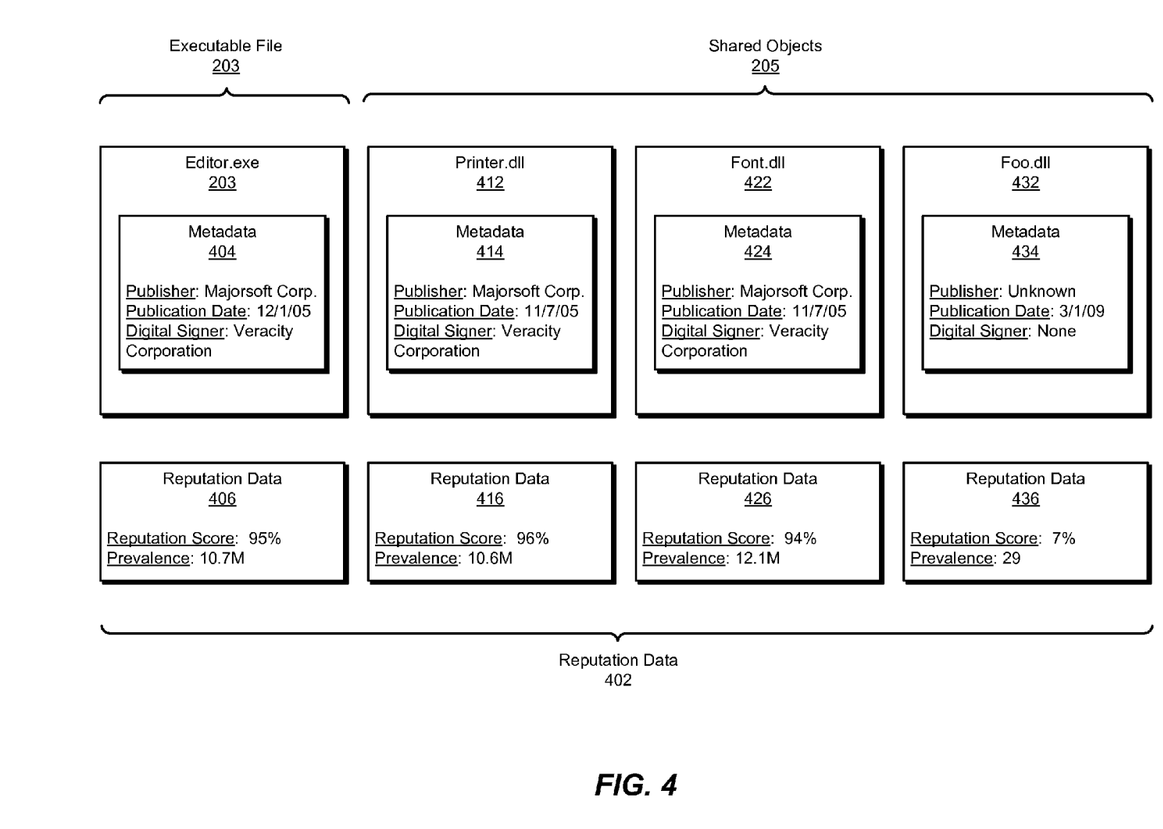
FIG. 4 is an exemplary illustration of reputation data received from a reputation service for both an executable file and a plurality of shared objects.

At step 306, the system may identify at least one shared object loaded by the process identified in step 302. For example, process-identification module 104 in FIG. 1 may determine that the process "editor.exe" identified in step 302 causes first client 202 in FIG. 2 to load a plurality of shared objects 205 (comprising, for example, shared objects 412 ("printer.dll"), 422 ("font.dll"), and 432 ("foo.dll"), as illustrated in FIG. 4) into memory of first client 202.

In one example, the system may identify each shared object that the process identified in step 302 causes to be loaded into memory. In an additional example, the system may only identify a portion (e.g., one) of the shared objects that the process identified at step 302 causes to be loaded into memory.

At step 308, the system may obtain, from a reputation service, reputation data for both the executable file identified in step 304 and the shared object identified in step 306. For example, reputation-data module 106 in FIG. 1 (which may, as detailed above, represent a portion of a security-software application on first client 202 in FIG. 2) may obtain reputation data for each of shared objects 205 (which, in this example, comprise printer.dll 412, font.dll 422, and foo.dll 432 in FIG. 4) from reputation service 206.

The term "reputation data," as used herein, generally refers to information that identifies a file's reputation or prevalence within a community (e.g., the user base of a security-software publisher). Examples of reputation data include, without limitation, reputation scores (where, for example, high reputation scores indicate that a file is generally trusted within a community and low reputation scores indicate that a file is generally untrusted within a community), prevalence information (e.g., information that identifies the number or percentage of user devices within a community that contain a copy of the file), or any other information that may be used to identify a community's opinion on the trustworthiness or legitimacy of a file.

In one example, the system may obtain reputation data in step 308 from a reputation service. As detailed above, reputation services may generate reputation data for files by collecting, aggregating, and analyzing data from user devices within a community. Examples of data gathered from user devices within a community that may be used to generate reputation data include, without limitation, information that identifies the overall health of a user device (i.e., information that identifies the performance, stability, and/or state of security of the user device), information that identifies the files stored on a user device, information that identifies the impact of a file on the health of the user device (e.g., information that identifies the health of a user device both before and after the file is stored on the user device), and any other information that may be used to evaluate the trustworthiness of a file. In some examples, by collecting, aggregating, and analyzing this data from potentially millions of user devices within a community (such as the user base of a security-software publisher), reputation services may be able to gain a fairly accurate understanding as to the trustworthiness of a file.

The system may perform step 308 in a variety of ways. In one example, reputation-data module 106 in FIG. 1 (which may, as detailed above, represent a portion of a security-software application on first client 202 in FIG. 2), may obtain reputation data for both executable file 203 and shared objects 205 from reputation service 206 in FIG. 2 by: 1) generating a hash for executable file 203 and each of shared objects 205, 2) sending these hashes, along with a request for reputation data for executable file and each of shared objects 205, to reputation service 206, and then 3) receiving the requested reputation data for executable file 203 and shared objects 205 from reputation service 206.

In some examples, the system may perform step 308 prior to a process launching. For example, reputation-data module 106 may obtain reputation data for both executable file 203 and shared objects 205 from reputation service 206 in FIG. 2 before the process identified in step 302 launches in order to improve runtime performance. In other examples, the system may perform step 308 after a process has launched. In addition, while the steps illustrated and/or described herein may be shown or discussed in a particular order, these steps do not necessarily need to be performed in the order illustrated or discussed.

FIG. 4 provides an exemplary illustration of reputation data 402 that may be obtained from a reputation service. As illustrated in this figure, reputation data 406, 416, 426, and 436 may contain information that identifies both a reputation score and prevalence information for executable file 203 (95% and 10.7 million users, respectively) and each of shared objects 412 (96% and 10.6 million users, respectively), 422 (94% and 12.1 million users, respectively), and 432 (7% and 29 users, respectively), respectively.

Returning to FIG. 3, at step 310 the system may determine, by analyzing and comparing the reputation data obtained in step 308, that at least one of the shared objects identified in step 306 represents a potential security risk. For example, security module 108 in FIG. 1 (which may, as detailed above, represent a portion of a security-software application on first client 202 in FIG. 2) may determine that at least one of shared objects 205 represents a potential security risk by analyzing and comparing reputation data 402 in FIG. 4.

In one example, the system may determine that a shared object represents a potential security risk by comparing reputation data for that shared object with reputation data for the executable file identified in step 304 (sometimes referred to herein as the shared object's "parent" executable file). For example, security module 108 in FIG. 1 may compare the reputation data 436 for shared object 432 ("foo.dll") with the reputation data 406 for an executable file 203 ("editor.exe") that is primarily responsible for launching the process "editor.exe." In this example, security module 108 may determine that the reputation data 436 for shared object 432 is significantly different from the reputation data 406 for executable file 203 since both the reputation score (7%) and prevalence information (29 users) associated with shared object 432 are significantly lower than the reputation score (95%) and prevalence information (10.7 million users) associated with executable file 203.

In an additional example, the system may determine that a shared object represents a potential security risk by comparing reputation data for that shared object with reputation data for at least one additional shared object that is loaded by the same process identified in step 302 (sometimes referred to herein as "sibling" shared objects). For example, security module 108 in FIG. 1 may compare the reputation data 436 for shared object 432 ("foo.dll") with the reputation data 416 and 426 for shared objects 412 ("printer.dll") and 422 ("font.dll"). In this example, security module 108 may determine that shared object 432 represents a potential security risk since both the reputation score (7%) and prevalence information (29 users) associated with shared object 432 are significantly lower than the reputation scores (96% and 94%, respectively) and prevalence information (10.6 million and 12.1 million users, respectively) associated with shared objects 412 and 422.

In some examples, the system may also determine that a shared object represents a potential security risk by identifying differences between metadata associated with the shared object and metadata associated with the shared object's parent executable file and/or sibling shared objects. For example, security module 108 in FIG. 1 may compare metadata 434 associated with shared object 432 ("foo.dll") in FIG. 4 with metadata 404, 414, and 424 associated with executable file 203 ("editor.exe"), shared object 412 ("printer.dll"), and shared object 422 ("font.dll"), respectively.

In this example, security module 108 may identify significant differences between the metadata 434 associated with shared object 432 and the metadata 404, 414, and 424 associated with executable file 203 and shared objects 412 and 422, respectively. For example, security module 108 may determine that the publisher ("Unknown"), publication year ("2009"), and digital signer ("None") information associated with shared object 432 is significantly different from the publisher ("MajorSoft Corporation"), publication year ("2005"), and digital signer ("Veracity Corp.") information associated with both executable file 203 and each of shared objects 412 and 422. Examples of information that may be contained within metadata that may be associated with files include, without limitation, information that identifies a publisher of a file, a date when the file was published, a digital signer of a file, or the like.

In some examples, the system may determine that a shared object represents a security risk if the reputation data and/or metadata associated with the shared object is significantly different from reputation data and/or metadata associated with a majority of the shared object's sibling shared objects. For example, in the case where a process loads 12 different DLLs, security module 108 in FIG. 1 may determine that the shared object "bar.dll" represents a potential security risk if the reputation data and/or metadata associated with "bar.dll" is significantly different from the reputation data and/or metadata associated with a majority of the 11 remaining DLLs loaded by the process.

Returning to FIG. 3, at step 312 the system may perform a security operation on the shared object identified as a potential security risk in step 310. For example, security module 108 in FIG. 1 (which may, as detailed above, represent a portion of a security-software application on first client 202 in FIG. 2) may, upon determining that shared object 432 ("foo.dll") in FIG. 4 represents a potential security risk, perform a security operation on shared object 432.

Examples of security operations that the system may perform include, without limitation, quarantining the shared object, removing the shared object, preventing the shared object from loading, flagging the shared object for further evaluation, removing references to the shared object (e.g., removing load points for the shared object from a device's registry), or any other operation that may be used to analyze or reduce the potential security risk posed by the shared object. Upon completion of step 312, exemplary method 300 in FIG. 3 may terminate.

In some examples, exemplary method 300 in FIG. 3 may also comprise sending the results of the comparisons performed in step 310 to a reputation service. For example, reputation-data module 106 in FIG. 1 (which may, as detailed above, represent a portion of security-software application installed on first client 202 in FIG. 2) may, upon comparing the reputation data and/or metadata associated with the shared object "foo.dll" with the reputation and/or metadata associated with the shared object's parent executable file and sibling shared objects, transmit the results of these comparisons to reputation service 206 in FIG. 2. Reputation service 206 may then use this information to update the reputation data associated with the shared object "foo.dll," as will be explained in greater detail below.

Figure 5:
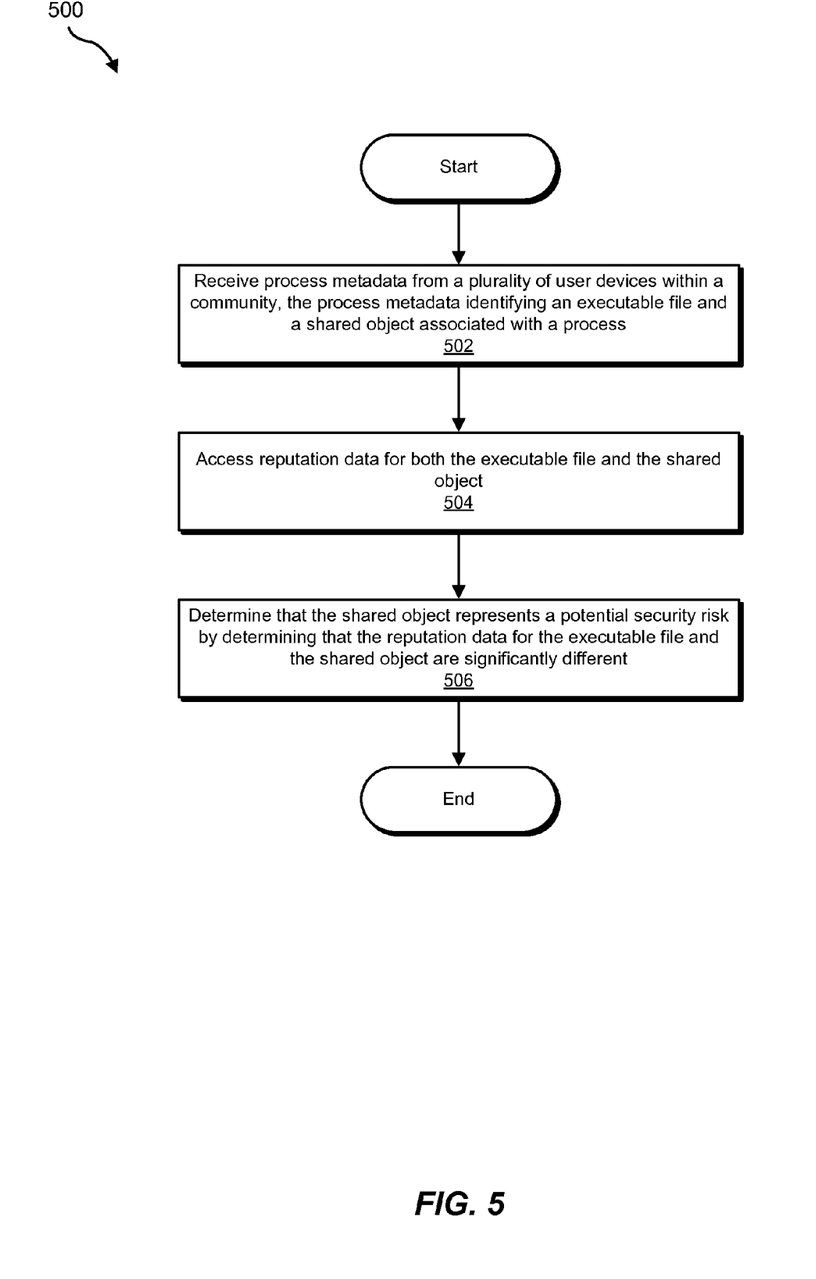
FIG. 5 is a flow diagram of an exemplary method for using reputation data to identify shared objects that pose potential security threats.

As detailed above, the various principles disclosed herein may also enable a backend to identify shared objects that pose potential security risks. FIG. 5 is a flow diagram of an exemplary computer-implemented method 500 for performing such a task. As illustrated in this figure, at step 502 the system may receive and process metadata from a plurality (potentially millions) of user devices within a community. For example, reputation service 206 in FIG. 2 may receive process metadata from first client 202, second client 212, and third client 222.

As detailed above, clients 202, 212, and 222 may represent all or a portion of a single community or a plurality of communities. For example, clients 202, 212, and 222 may represent computing devices within a single or a plurality of user bases, a single or a plurality of enterprises, or portions or combinations of one or more of the same.

The term "process metadata" generally refers to information that identifies, or that regards or concerns, a process. Examples of process metadata include information that represents or identifies, for at least one process, the process' name, an executable file associated with the process (e.g., an executable file that is primarily responsible for loading the process), and/or at least one shared object loaded by the process (e.g., DLLs that the process causes to be loaded into memory of a computing system during execution). In some examples, process metadata may also include a hash of the executable file associated with the process and a hash of each of the shared objects loaded by the process. In at least one example, process metadata may be stored in process-metadata database 122 in FIG. 1 (which may, as detailed above, represent a portion of reputation service 206 in FIG. 2 and/or a remote database).

At step 504, the system may access reputation data for both an executable file and shared objects that are associated with a process. For example, reputation service 206 in FIG. 2 may retrieve, from reputation-data database 124 in FIG. 1, reputation data for both: 1) an executable file associated with a process (as identified in the process metadata received from a plurality of user devices within a community) and 2) each shared object loaded by the process (as identified in the process metadata received from the plurality of user devices within the community).

At step 506, the system may determine that at least one of the shared objects identified in the process metadata received in step 502 represents a potential security risk by comparing the reputation data for the executable file associated with the process with the reputation data associated with each of the shared objects loaded by the process (as identified in the process metadata received from a plurality of user devices within the community).

For example, as explained in greater detail above, reputation service 206 in FIG. 2 may determine that shared object 432 ("foo.dll") in FIG. 4 represents a potential security risk since both the reputation data 436 and metadata 434 associated with shared object 432 are significantly different from both the reputation data 406, 416, and 426 and metadata 404, 414, and 424 associated with executable file 203 ("editor.exe") and shared objects 412 ("printer.dll") and 422 ("font.dll"). Upon completion of step 506, exemplary method 500 may terminate.

The system may also perform a variety of additional analyses in order to determine whether a shared object represents a potential security risk. For example, reputation service 206 in FIG. 2 may, by analyzing the process metadata received from a plurality (potentially millions) of user devices within a community, determine that: 1) a particular shared object ("foo.dll") is rarely loaded by a particular process (e.g., "editor.exe"), 2) that a particular shared object (e.g., "foo.dll") is rarely associated with shared objects (e.g., "printer.dll" and "font.dll") that are commonly loaded by a particular process (e.g., "editor.exe"), 3) that a particular shared object (e.g., "foo.dll") is frequently loaded by compromised user devices within the community (i.e., user devices with low overall health or hygiene scores), and 4) that a particular shared object (e.g., "foo.dll") is frequently loaded by processes (e.g., "foobar.exe") with low reputation scores.

In some examples, upon completing the comparative analysis operations in step 506, the system may update the reputation data that is associated with the shared object in question. For example, reputation service 206 in FIG. 2 may update reputation data associated with shared object 432 ("foo.dll") in reputation-data database 124 in FIG. 1 based on the results of the comparisons performed in step 506. In some examples, reputation service 206 may transform or modify a characteristic or property of reputation-data database 124 by updating (e.g., by storing) reputation data associated with shared object 432 in reputation-data database 124.

By comparing reputation data associated with a shared object with reputation data associated with the shared object's parent executable file and/or sibling shared objects, the exemplary systems and methods described herein may enable security-software developers to quickly and easily identify shared-object-based security threats, even if those threats operate within process space associated with an otherwise legitimate application or process. As such, the systems and methods described herein may enable security-software publishers to effectively detect, prevent, and/or remove such threats.

Figure 6:
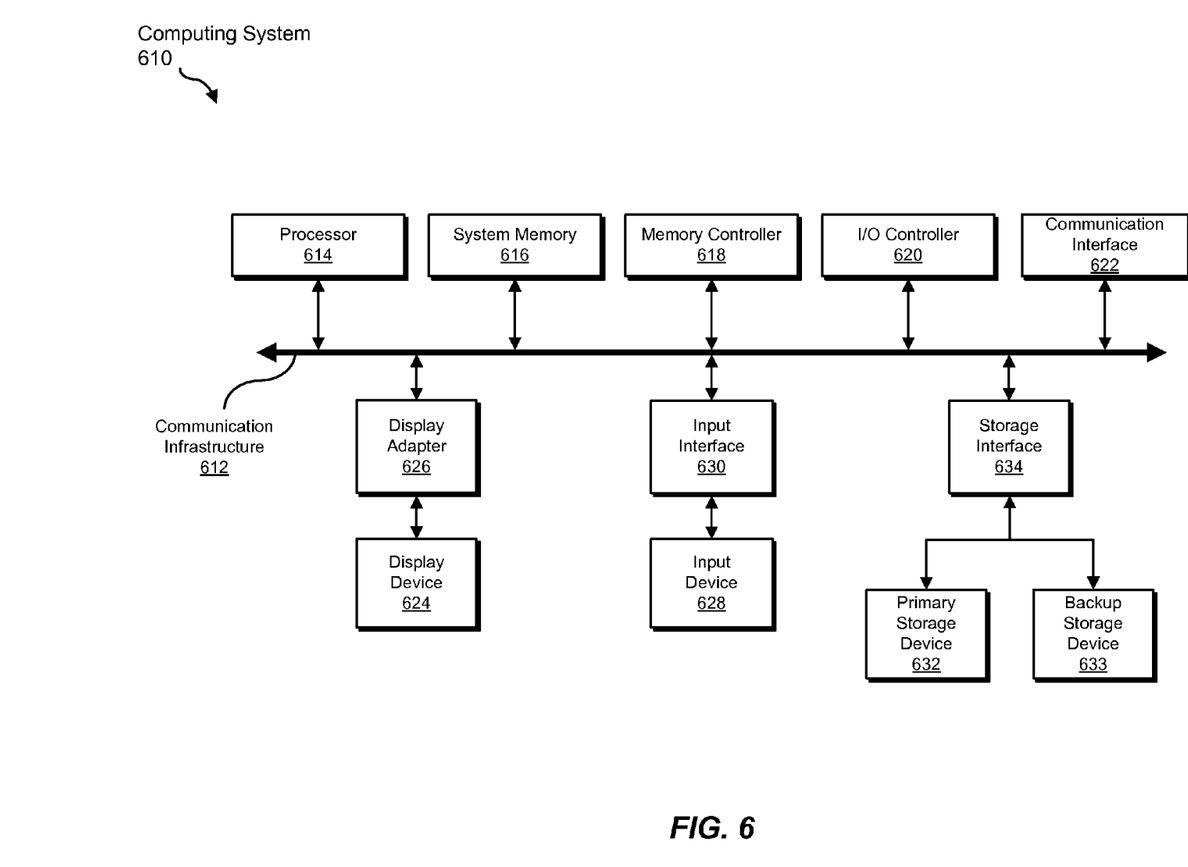
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, obtaining, determining, comparing, sending, receiving, quarantining, removing, preventing, flagging, detecting, accessing, analyzing, and updating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, obtaining, determining, comparing, sending, receiving, quarantining, removing, preventing, flagging, detecting, accessing, analyzing, and updating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, obtaining, determining, comparing, sending, receiving, quarantining, removing, preventing, flagging, detecting, accessing, analyzing, and updating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, obtaining, determining, comparing, sending, receiving, quarantining, removing, preventing, flagging, detecting, accessing, analyzing, and updating steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, obtaining, determining, comparing, sending, receiving, quarantining, removing, preventing, flagging, detecting, accessing, analyzing, and updating steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, obtaining, determining, comparing, sending, receiving, quarantining, removing, preventing, flagging, detecting, accessing, analyzing, and updating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
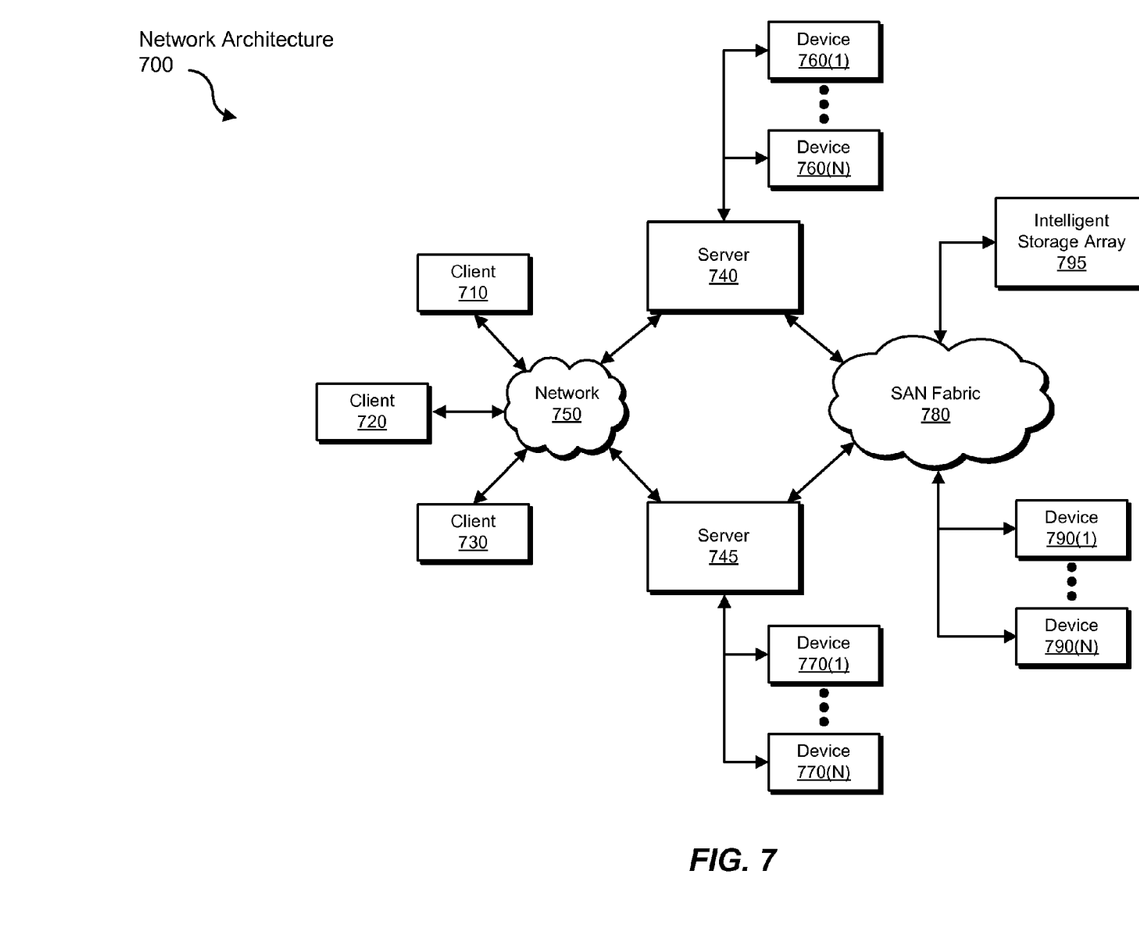
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, obtaining, determining, comparing, sending, receiving, quarantining, removing, preventing, flagging, detecting, accessing, analyzing, and updating steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for using reputation data to detect shared-object-based security threats. Such a method may comprise: 1) identifying a process, 2) identifying an executable file associated with the process, 3) identifying at least one shared object loaded by the process, 4) obtaining reputation data for both the executable file and the shared object from a reputation service, 5) determining that the shared object represents a potential security risk by a) comparing the reputation data for the executable file with the reputation data for the shared object and b) determining that the reputation data for the shared object is significantly different from the reputation data for the executable file, and then 6) performing a security operation on the shared object.

The reputation data may comprise information that identifies a file's reputation within a community and/or information that identifies a file's prevalence within a community. In this example, determining that the reputation data for the shared object is significantly different from the reputation data for the executable file may comprise determining that the shared object's reputation and/or prevalence is significantly lower than the executable file's reputation.

The method may also comprise identifying a plurality of additional shared objects loaded by the process. In this example, determining that the shared object represents a potential security risk further may comprise: 1) obtaining reputation data for each of the additional shared objects from the reputation service, 2) comparing the reputation data for the shared object with the reputation data for each of the additional shared objects, and then 3) determining that the reputation data for the shared object is significantly different from the reputation data for a majority of the additional shared objects.

In some examples, determining that the shared object represents a potential security risk may further comprise: 1) identifying file metadata associated with the executable file, 2) identifying file metadata associated with the shared object, 3) comparing the file metadata associated with the executable file with the file metadata associated with the shared object, and then 4) determining that the file metadata associated with the shared object is significantly different from the file metadata associated with the executable file. The file metadata may contain information that identifies a publisher of a file, a date when a file was published, and/or a digital signer of a file.

In one example, obtaining reputation data for both the executable file and the shared object from the reputation service may comprise: 1) sending a request for reputation data for both the executable file and the shared object to the reputation service, the request comprising a hash of the executable file and a hash of the shared object, and then 2) receiving the reputation data for both the executable file and the shared object from the reputation service.

The process may be identified at loadtime or runtime. In addition, performing the security operation may comprise quarantining the shared object, removing the shared object, preventing the shared object from loading, flagging the shared object for further evaluation, and/or removing references to the shared object from the computing device.

In some examples, the method may also comprise sending results of the comparison to the reputation service. In addition, the executable file may represent an executable file that is primarily responsible for launching the process.

Computing system 610 and/or one or more components of network architecture 700 may also perform and/or be a means for performing, either alone or in combination with other elements, one or more steps of an exemplary method for using reputation data to identify shared objects that pose potential security threats, at least a portion of the method being performed by a computing device comprising at least one processor. In one example, this method may comprise: 1) receiving process metadata from a plurality of user devices within a community, the process metadata comprising, for at least one process, information that identifies an executable file associated with the process and at least one shared object loaded by the process, 2) accessing reputation data for both the executable file and the shared object, and then 3) determining that the shared object represents a potential security risk by a) comparing the reputation data for the executable file with the reputation data for the shared object and b) determining that the reputation data for the shared object is significantly different from the reputation data for the executable file.

The process metadata further may contain information that identifies the process' name, a hash of the executable file, and/or a hash of the shared object. The process metadata may also contain information that identifies a plurality of additional shared objects loaded by the process. In this example, determining that the shared object represents a potential security risk may further comprise: 1) accessing reputation data for each of the additional shared objects, 2) comparing the reputation data for the shared object with the reputation data for each of the additional shared objects, and then 3) determining that the reputation data for the shared object is significantly different from the reputation data for a majority of the additional shared objects. Determining that the shared object represents a potential security risk may also comprise determining, by analyzing the file metadata received from user devices within the community, that the shared object is rarely loaded by the process, that the shared object is rarely associated with the additional shared objects, that the shared object is frequently loaded by compromised user devices, and/or that the shared object is frequently loaded by processes with low reputation scores. In one example, the method may also comprise updating the reputation data for the shared object based on results of the comparison.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using reputation data to detect shared-object-based security threats, the method comprising:
   identifying a process;
   identifying an executable file associated with the process;
   identifying at least one shared object loaded by the process;
   obtaining reputation data for both the executable file and the shared object from a reputation server, wherein the reputation data for both the executable file and the shared object is based on data gathered from a plurality of user devices within a community;

determining that the shared object represents a potential security risk by:
comparing the reputation data for the executable file with the reputation data for the shared object;
identifying, based on the comparison, a mismatch between the reputation data for the shared object and the reputation data for the executable file;
performing a security operation on the shared object;
wherein the method is performed by at least one hardware-based processor of a computing device.

2. The method of claim 1, wherein the reputation data comprises at least one of:
information that identifies a file's reputation within the community;
information that identifies a file's prevalence within the community.

3. The method of claim 2, wherein identifying the mismatch between the reputation data for the shared object and the reputation data for the executable file comprises at least one of:
determining that the shared object's reputation is lower than the executable file's reputation;
determining that the shared object's prevalence is lower than the executable file's prevalence.

4. The method of claim 1, further comprising identifying a plurality of additional shared objects loaded by the process, wherein determining that the shared object represents a potential security risk further comprises:
obtaining reputation data for each of the additional shared objects from the reputation server;
comparing the reputation data for the shared object with the reputation data for each of the additional shared objects;
identifying, based on the comparison, a mismatch between the reputation data for the shared object and the reputation data for a majority of the additional shared objects.

5. The method of claim 1, wherein determining that the shared object represents a potential security risk further comprises:
identifying file metadata associated with the executable file;
identifying file metadata associated with the shared object;
comparing the file metadata associated with the executable file with the file metadata associated with the shared object;
identifying, based on the comparison, a mismatch between the file metadata associated with the shared object and the file metadata associated with the executable file.

6. The method of claim 5, wherein the file metadata comprises information that identifies at least one of:
a publisher of a file;
a date when a file was published;
a digital signer of a file.

7. The method of claim 1, wherein obtaining reputation data for both the executable file and the shared object from the reputation server comprises:
sending a request for the reputation data for both the executable file and the shared object to the reputation server, the request comprising a hash of the executable file and a hash of the shared object;
receiving the reputation data for both the executable file and the shared object from the reputation server.

8. The method of claim 1, wherein performing the security operation comprises at least one of:
quarantining the shared object;
removing the shared object;
preventing the shared object from loading;
flagging the shared object for further evaluation;
removing references to the shared object from the computing device.

9. The method of claim 1, wherein identifying the process comprises:
detecting the process at loadtime;
detecting the process at runtime.

10. The method of claim 1, further comprising sending results of the comparison to the reputation server.

11. The method of claim 1, wherein the executable file comprises an executable file that is primarily responsible for launching the process.

12. A computer-implemented method for using reputation data to identify shared objects that pose potential security threats, the method comprising:
receiving, at a reputation server comprising at least one hardware-based processor, process metadata from a plurality of user devices within a community, the process metadata comprising, for at least one process, information that identifies:
an executable file associated with the process;
at least one shared object loaded by the process;
accessing, at the reputation server, reputation data for both the executable file and the shared object, wherein the reputation data for both the executable file and the shared object is generated based on data gathered from the community;
determining, at the reputation server, that the shared object represents a potential security risk by:
comparing the reputation data for the executable file with the reputation data for the shared object;
identifying, based on the comparison, a mismatch between the reputation data for the shared object and the reputation data for the executable file.

13. The method of claim 12, wherein the process metadata further comprises information that identifies:
the process' name;
a hash of the executable file;
a hash of the shared object.

14. The method of claim 12, wherein the process metadata further comprises information that identifies a plurality of additional shared objects loaded by the process, wherein determining that the shared object represents a potential security risk further comprises:
accessing reputation data for each of the additional shared objects;
comparing the reputation data for the shared object with the reputation data for each of the additional shared objects;
identifying, based on the comparison, a mismatch between the reputation data for the shared object and the reputation data for a majority of the additional shared objects.

15. The method of claim 14, wherein determining that the shared object represents a potential security risk further comprises determining, by analyzing the process metadata received from the user devices within the community, at least one of:
that the shared object is rarely loaded by the process;
that the shared object is rarely associated with the additional shared objects;
that the shared object is frequently loaded by compromised user devices;
that the shared object is frequently loaded by processes with low reputation scores.

16. The method of claim 12, further comprising updating the reputation data for the shared object.

17. The method of claim 12, wherein the reputation data comprises at least one of:
- information that identifies a file's reputation within the community;
- information that identifies a file's prevalence within the community.

18. The method of claim 12, wherein determining that the shared object represents a potential security risk further comprises:
- identifying file metadata associated with the executable file;
- identifying file metadata associated with the shared object;
- comparing the file metadata associated with the executable file with the file metadata associated with the shared object;
- identifying, based on the comparison, a mismatch between the file metadata associated with the shared object and the file metadata associated with the executable file.

19. The method of claim 18, wherein the file metadata comprises information that identifies at least one of:
- a publisher of a file;
- a date when a file was published;
- a digital signer of a file.

20. A non-transitory computer-readable storage medium comprising computer-readable instructions that, when executed by a processor of a computing device, cause the computing device to:
- identify a process;
- identify an executable file associated with the process;
- identify at least one shared object loaded by the process;
- obtain reputation data for both the executable file and the shared object from a reputation server, wherein the reputation data for both the executable file and the shared object is based on data gathered from a plurality of user devices within a community;
- determine that the shared object represents a potential security risk by:
  - comparing the reputation data for the executable file with the reputation data for the shared object;
  - identifying, based on the comparison, a mismatch between the reputation data for the shared object and the reputation data for the executable file;
- performing a security operation on the shared object.

* * * * *